(12) United States Patent
Lin et al.

(10) Patent No.: US 7,571,445 B2
(45) Date of Patent: Aug. 4, 2009

(54) SYSTEM AND METHOD FOR DYNAMIC DEVICE DRIVER SUPPORT IN AN OPEN SOURCE OPERATING SYSTEM

(75) Inventors: Chieng-Hwa Lin, Austin, TX (US); Sanjay Rao, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 493 days.

(21) Appl. No.: 09/998,153

(22) Filed: Nov. 29, 2001

(65) Prior Publication Data

US 2003/0101290 A1 May 29, 2003

(51) Int. Cl.
*G06F 13/00* (2006.01)

(52) U.S. Cl. .................. 719/321; 719/313; 719/327; 719/328; 719/331; 717/140; 717/145; 717/162

(58) Field of Classification Search ......... 719/321–327, 719/328, 313, 331; 717/111, 140, 145, 162
See application file for complete search history.

(56) References Cited

U.S. PATENT DOCUMENTS

| | | | | |
|---|---|---|---|---|
| 4,589,063 A | 5/1986 | Shah et al. | | 364/300 |
| 4,761,737 A | 8/1988 | Duvall et al. | | 364/300 |
| 5,109,515 A | 4/1992 | Laggis et al. | | 395/725 |
| 5,265,239 A | 11/1993 | Ardolino | | 395/500 |
| 5,353,411 A | 10/1994 | Nakaosa et al. | | 395/275 |
| 5,355,501 A | 10/1994 | Gross et al. | | 395/750 |
| 5,359,713 A | 10/1994 | Moran et al. | | 395/200 |
| 5,390,301 A | 2/1995 | Scherf | | 395/325 |
| 5,423,022 A | 6/1995 | Ackley | | 395/500 |
| 5,452,460 A | 9/1995 | Distelberg et al. | | 395/700 |
| 5,459,867 A | 10/1995 | Adams et al. | | 395/700 |
| 5,481,620 A | 1/1996 | Vaidyanathan | | 382/169 |
| 5,483,649 A | 1/1996 | Kuznetsov et al. | | 395/186 |
| 5,519,853 A | 5/1996 | Moran et al. | | 395/550 |
| 5,608,820 A | 3/1997 | Vaidyanathan | | 382/169 |
| 5,655,126 A | 8/1997 | Glenning | | 395/750.06 |
| 5,671,290 A | 9/1997 | Vaidyanathan | | 382/133 |
| 5,675,795 A | 10/1997 | Rawson, III et al. | | 395/652 |
| 5,699,452 A | 12/1997 | Vaidyanathan | | 382/168 |
| 5,734,747 A | 3/1998 | Vaidyanathan | | 382/170 |

(Continued)

OTHER PUBLICATIONS

Matia, "Kernel Korner Writing a Linux Driver", 1998, Specialize Systems Consultants, Inc., pp. 1-12.*

(Continued)

*Primary Examiner*—Meng-Ai An
*Assistant Examiner*—Phuong N Hoang
(74) *Attorney, Agent, or Firm*—Baker Botts L.L.P.

(57) ABSTRACT

A system and method for dynamic device driver support in an open source operating system is disclosed in which a device driver includes one or more driver modules in executable format and a service layer provided to the user of the computer system in an open source format. The open source service layer can be compiled against the kernel of the operating system, causing the compiled service layer to be compatible with the kernel of the operating system, including any naming conventions followed by function calls of the kernel of the operating system. Because the executable driver modules are not easily accessible, proprietary information concerning the hardware architecture may be included in these modules.

10 Claims, 2 Drawing Sheets

U.S. PATENT DOCUMENTS

| | | | | |
|---|---|---|---|---|
| 5,754,858 | A * | 5/1998 | Broman et al. | 717/111 |
| 5,765,021 | A | 6/1998 | Hsu et al. | 395/828 |
| 5,778,226 | A | 7/1998 | Adams et al. | 395/681 |
| 5,809,303 | A | 9/1998 | Senator | 395/681 |
| 5,812,767 | A | 9/1998 | Desai et al. | 395/200.8 |
| 5,815,689 | A | 9/1998 | Shaw et al. | 395/551 |
| 5,854,894 | A | 12/1998 | Lancaster et al. | 395/200.43 |
| 5,867,710 | A | 2/1999 | Dorris et al. | 395/704 |
| 5,889,988 | A | 3/1999 | Held | 395/673 |
| 5,913,058 | A | 6/1999 | Bonola | 395/652 |
| 5,958,049 | A | 9/1999 | Mealey et al. | 713/1 |
| 5,974,547 | A | 10/1999 | Klimenko | 713/2 |
| 5,978,857 | A | 11/1999 | Graham | 709/301 |
| 5,978,912 | A | 11/1999 | Rakavy et al. | 713/2 |
| 5,983,012 | A | 11/1999 | Blanchi et al. | 395/500.44 |
| 5,987,565 | A | 11/1999 | Gavaskar | 711/712 |
| 5,991,822 | A | 11/1999 | Mealey et al. | 709/301 |
| 6,006,029 | A | 12/1999 | Blanchi et al. | 395/500.45 |
| 6,006,284 | A | 12/1999 | Cockroft | 710/14 |
| 6,047,124 | A | 4/2000 | Marsland | 395/704 |
| 6,052,743 | A | 4/2000 | Schwan et al. | 710/23 |
| 6,092,163 | A | 7/2000 | Kyler et al. | 711/163 |
| 6,134,567 | A | 10/2000 | Nakkiran et al. | 707/526 |
| 6,151,625 | A | 11/2000 | Swales et al. | 709/218 |
| 6,157,959 | A | 12/2000 | Bonham et al. | 709/300 |
| 6,163,806 | A | 12/2000 | Viswanathan et al. | 709/229 |
| 6,205,492 | B1 | 3/2001 | Shaw et al. | 709/321 |
| 6,209,041 | B1 | 3/2001 | Shaw et al. | 709/321 |
| 6,212,574 | B1 | 4/2001 | O'Rourke et al. | 709/321 |
| 6,219,828 | B1 | 4/2001 | Lee | 714/4 |
| 6,243,753 | B1 | 6/2001 | Machin et al. | 709/227 |
| 6,253,255 | B1 * | 6/2001 | Hyder et al. | 719/321 |
| 6,282,454 | B1 | 8/2001 | Papadopoulos et al. | 700/83 |
| 6,289,396 | B1 * | 9/2001 | Keller et al. | 719/323 |
| 6,425,038 | B1 * | 7/2002 | Sprecher | 710/269 |
| 6,668,277 | B1 * | 12/2003 | Gritzo | 709/217 |

OTHER PUBLICATIONS

Itoh, "SCONE: Using Concurrent Objects for Low-level Operating System Programming", 1995, ACM 0-89791-703, pp. 385-398.*

Pending U.S. Appl. No. 09/726,112, "System and Method for Installing Device Drivers in a Computer System," filed Nov. 29, 2000.

Radhakrishnan, S., "Linux—Advanced Networking Overview Version 1," paper submitted to the Information and Telecommunications Technology Center, Dept. of Electrical Engineering & Computer Science, The University of Kansas, Aug. 22, 1999.

Wreski, D., "Linux 2.4: Next Generation Kemel Security," http://www.linuxsecurity.com/geature_stories/kemel-24-secuity-printer.html, 5 pp.

Wilbum, G., "Linux Inside: Introduction," *The Computer Paper*, Aug. 1999, http://www.northernjourney.com/opensource/linside/li001.html, 5 pp.

"The Linux Kemel Archives," http://www.kemel.org, 3pp.

"The Linux Installation HOWTO," http://mirrors.kemel.org/LDP/HOTTO/Installation-HOWTO, 26 pp.

"Red Hat Linux Security Advisory," http://www.redhat.com/support/errata/RHSA-2001-047.html, 6 pp.

Notes from installation guide, http://www.redhat.com/docs/manuals/linu...Manual/install-guide/manual, 2 pp.

Pending U.S. Appl. No. 09/726,112, "System and Method for Installing Device Drivers in a Computer System," filed Nov. 29, 2000.

Radhakrishnan, S., "Linux—Advanced Networking Overview Version 1," paper submitted to the Information and Telecommunications Technology Center, Dept. of Electrical Engineering & Computer Science, The University of Kansas, Aug. 22, 1999.

Wreski, D., "Linux 2.4: Next Generation Kemel Security," .linuxsecurity.com/geature_stories/kemel-24-security-printer.html, 5 pp, Mar. 1, 2001.

Wilbum, G., "Linux Inside: Introduction," *The Computer Paper*, Aug. 1999, .northernjourney.com/opensource/linside/li001.html, 5 pp, Sep. 1999.

"The Linux Kemel Archives," .kemel.org, 3pp.

"The Linux Installation HOWTO," /mirrors.kemel.org/LDP/HOTTO/Installation-HOWTO, 26 pp.

"Red Hat Linux Security Advisory," .redhat.com/support/errata/RHSA-2001-047.html, 6 pp, Apr. 17, 2001.

Notes from installation guide, .redhat.com/docs/manuals/linu...Manual/install-guide/manual, 2 pp.

* cited by examiner

SYSTEM AND METHOD FOR DYNAMIC DEVICE DRIVER SUPPORT IN AN OPEN SOURCE OPERATING SYSTEM

TECHNICAL FIELD

The present disclosure relates generally to the field of computer systems and, more specifically, to a system and method for dynamic device driver support for the kernel of an open source operating system.

BACKGROUND

The operating system of a computer server is an interface between the hardware and the software applications of the computer system. Each operating system, sometimes referred to as a kernel, typically includes an element of software code known as a device driver. The term kernel is sometimes used to refer to the lowest level of the operating system. The device driver of the kernel typically resides in the lowest level of the operating system and provides the low level interface between the hardware elements of the computer system and the operating system to direct the operation of the hardware elements of the computer system.

Because the device driver of an operating system provides an interface between the hardware of the computer system and the application programs of the computer systems, the application programs of the computer system are able to interface with the hardware without the necessity of making functions calls that are specific to the hardware architecture of each model of computer system. Through function calls to the operating system or kernel application programs may request certain action by the hardware resources of the computer system, including such hardware resources as the CPU, storage devices, memory, and input/output devices. Once such a function call is received by the operating system, the device driver of the operating system or kernel interfaces with the hardware resources of the computer system. A device driver, which serves as a software interface between the application and the hardware architecture of the computer system, may be written specifically for the hardware architecture of the computer system. The operating system communicates with the device driver of the computer system to request certain functions of the hardware of the computer system, including CPU scheduling functions, interrupt functions, memory management functions, memory storage and retrieval functions, and device input and output functions.

Open source operating systems, such as Linux, a standardized version of which is marketed by Red Hat, Inc. of Durham, N.C., have come into more common use in computer systems. Open source software is characterized by freely available source code. In the case of an open source operating system, the source code of the operating system is accessible to users of the operating system. Because the source code of an open source operating system is available, the software may be readily modified to accommodate the needs or desires of the user. Even the most sensitive portions of an open source operating system, including the kernel, may be modified. After a modification by the user, the user may choose to distribute the source code to others, leading to a gradual evolution in the product. It is theorized that the ability to modify and distribute open source software leads to the faster correction of bugs and improvement of the functionality of the software, as compared with proprietary software packages. The source code for the Red Hat Linux operating system may be downloaded from the Internet or the software may be purchased from a vendor in a packaged format.

With respect to the Linux open source operating system, the Linux operating system runs on a number of hardware platforms, including computer systems platforms for desktop computer systems and server systems. A number of vendors package and sell a standardized version of the Linux operating system. This packaged system includes application programs, installation tools, utility programs, development tools, graphical interface, and the device drivers. Even though a standardized version of an open source operating system may be purchased from a third party vendor, the operating system, including the kernel, may be readily modified by the user to create a customized operating system.

Computer system manufacturers are now offering the option of installing open source operating systems in computers systems, including server systems. As part of the open source operating system, the computer system manufacturer will typically include in the operating system package a device driver that is specific to the computer system model or family of computer system models of the computer system manufacturer. One difficulty of providing an open source driver as part of an open source operating system is that the source code of the open source driver may contain proprietary information concerning the hardware architecture of the computer system or the family of computer systems of the computer system manufacturer. A possible solution to this problem is to provide to users a precompiled device driver. The user or a competitor would not be able to identify in the compiled device driver the proprietary information that could possibly be found in the source code of the device driver.

The option of providing a precompiled device driver is not completely satisfactory. In the Linux operating system, for example, the precompiled device driver only works with the kernel that the driver is compiled against. When the device driver is compiled for the sake of execution, the device driver will expect to receive function calls from the kernel that are named according to a naming convention in which the suffix of the function call name is specific to the Linux kernel. A change to the source code of the kernel, which would necessitate the recompilation of the kernel, results in a change to the names of the function calls of the kernel. In this instance, the names of the function calls of the kernel would not match the names expected by the compiled device driver. As a result, a device driver only works for the kernel that the device driver is compiled against because the function call names must match between the compiled kernel and the compiled device driver.

Although a hardware vendor can supply precompiled device drivers to support a few popular Linux kernels, many other kernels will be left unsupported. If a computer manufacturer, wants its device driver to support all Linux kernels, source code for the device driver must be provided to vendors of standardized version of the open source operating system so the source code can be distributed to customers, enabling the customers to compile the device driver against the kernel of the customer's operating system. The difficulty with the approach of distributing an open source driver is that if proprietary information concerning the products of the hardware manufacturer is included in the open source driver, this information may become known to others.

SUMMARY

The present disclosure concerns a system and method for providing device driver support in an open source operating system. A device driver for a computer system that includes an open source operating system, including an open source kernel, is constructed from an open source service layer and a set of precompiled driver modules. Once compiled against the kernel of the operating system, the service layer provides an interface between the kernel of the operating system and the applicable driver modules. The set of driver modules includes a number of individual driver modules, with each of the individual driver modules being specific to a hardware architecture of the computer system.

The kernel of the operating system and the compiled service layer are able to pass between one another function calls that are named according to a naming convention. The function calls passed between the kernel of the operating system and the compiled service layer are not specific to the hardware architecture of the computer system. The compiled service layer is able to pass to the appropriate driver module commands that are specific to the hardware architecture of the computer system. The service layer thus provides an interface between the open source operating system and a set of precompiled device drivers. If the kernel of the operating system is modified, the service layer is recompiled against the modified kernel.

A technical advantage of the present disclosure is the provision of a device driver for an open source operating system that permits the computer system manufacturer to provide device drivers for its computer systems, while preventing the disclosure of sensitive proprietary information in those device drivers. The device driver of the present invention includes a portion that is provided in an open source format. This portion can be compiled against the kernel of the operating system to satisfy the naming convention of the kernel function calls of the open source operating system. Another portion of the device driver includes precompiled driver modules. The precompiled driver modules may contain proprietary information concerning the hardware architecture. The communication between the kernel and the compiled service layer is not specific to the hardware architecture of the computer system, while the communication between the compiled service layer and the compiled driver modules may be specific to the hardware architecture of the computer system.

Another technical advantage of the present invention is a method for distributing device driver software to users of a computer system having an open source operating system. A device driver having an open source service layer is provided. The provision of the open source service layer permits a user to modify or replace the kernel of the operating system. Once the user modifies the kernel of the operating system, the user can rebuild the device driver of the computer system by compiling the service layer against the modified operating system kernel. In this manner, the user can continue to modify the open source operating system, while proprietary information of the computer system manufacturer is protected against disclosure and resides in the precompiled driver modules of the device driver.

Other technical advantages will be apparent to those of ordinary skill in the art in view of the following specification claims, and drawings.

DETAILED DESCRIPTION

The present disclosure concerns a method and system for dynamic device driver support to accommodate modifications to the open source kernel of an open source operating system. An open source operating system will include a device driver that serves as an interface between the kernel of the operating system and the hardware of the computer system. The device driver of the present invention includes two elements, the first of which is a set of one or more driver modules. The driver modules are compiled, executable code. The second element of the device driver is an open source service layer. The open source service layer is an intermediate software layer that serves as a software interface between the kernel of the operating system and the driver modules of the device driver.

When the open source service layer is compiled against the kernel of the operating system, the compiled service layer is configured with respect to the kernel. As such, the compiled service layer recognizes the naming convention of the function calls from the kernel. The compiled service layer interacts with the compiled driver modules and serves as an intermediary between the driver modules, which are specific to the hardware architecture of the computer system, and the kernel. Because of the presence of the compiled service layer between the kernel and the compiled driver modules, the compiled driver modules do not have to recognize changes to the kernel of the operating system. The service layer can be recompiled, if necessary, against the kernel. As such, the function of the driver modules is not dependent on the naming convention of the function calls from kernel, and modifications to the kernel do not affect the operation of the driver modules.

Figure 1:
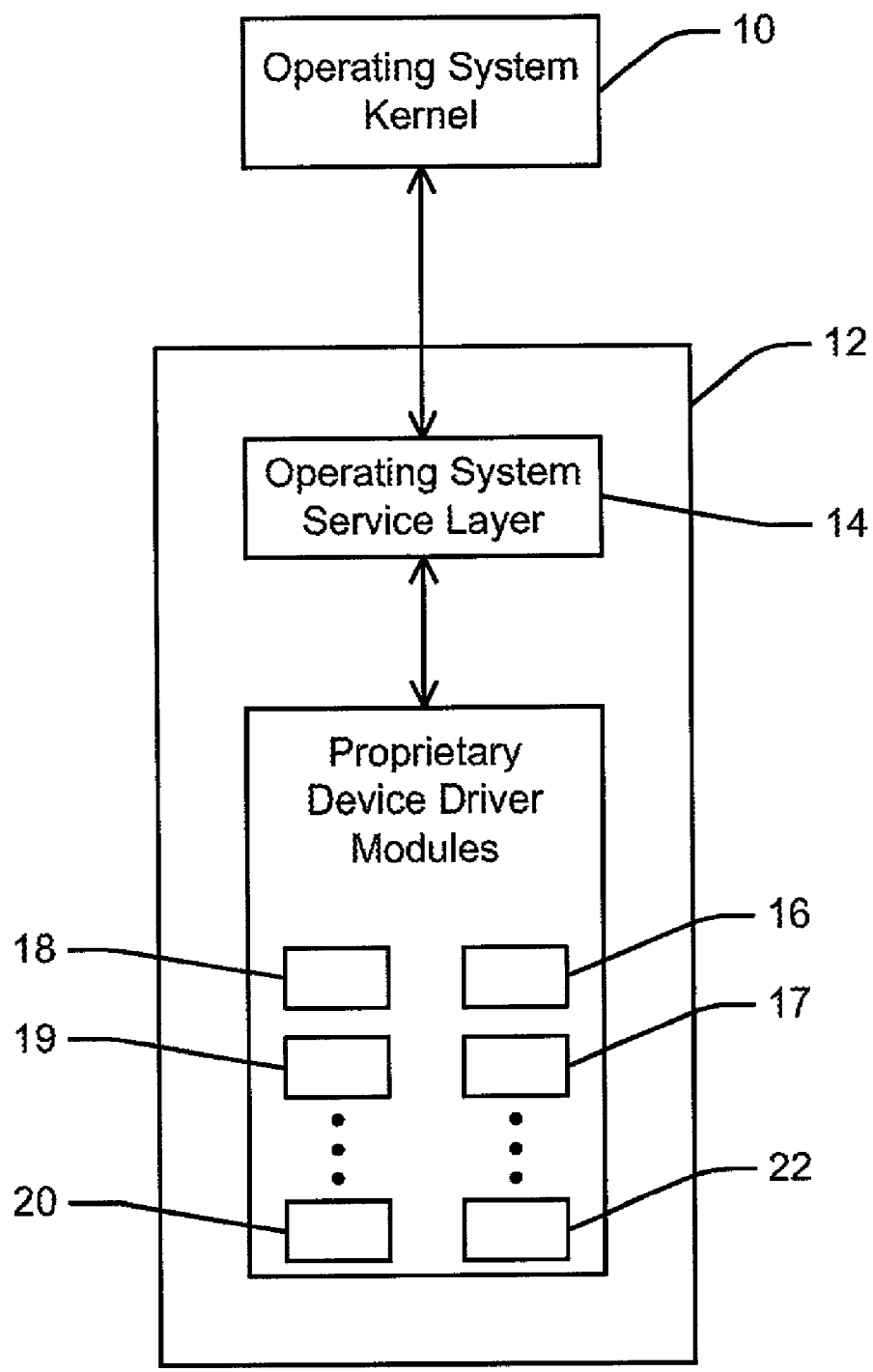
FIG. 1 is a block diagram of the logical relationship of software elements of the present disclosure.

Shown in FIG. 1 is a block diagram of the logical relationship of the device driver modules, operating system service layer, and operating system kernel. A device driver 12 includes an operating system service layer 12 and one or more device driver modules 16-22. Each device driver module is associated with the hardware architecture of a computer system model of a family of computer systems. As an example, a computer manufacturer may have thirty or more computer system models within a family of server systems. Each computer system model will have an associated device driver module. Each of the device driver modules is provided to users in executable, or compiled, format. Because the device driver modules are in an executable format, it is difficult, if not impossible, to identify the proprietary content within the module concerning the hardware architecture of the computer system or family of computer systems.

Also shown in FIG. 1 is an operating system service layer 14. The operating system service layer is provided to users in an open source format. As shown in FIG. 1, the operating system service layer 14 serves as an interface between operating system kernel 10 and device driver modules 16-22. Functions calls to device driver 12 are received by operating system service layer 14, which processes the function calls and interfaces with proper device driver module to complete the requested function call directed to the hardware of the computer system. In the case of a device driver that includes several driver modules, operating system service layer 14 will interact with only the device driver module associated with the hardware architecture of the computer system model.

Figure 2:
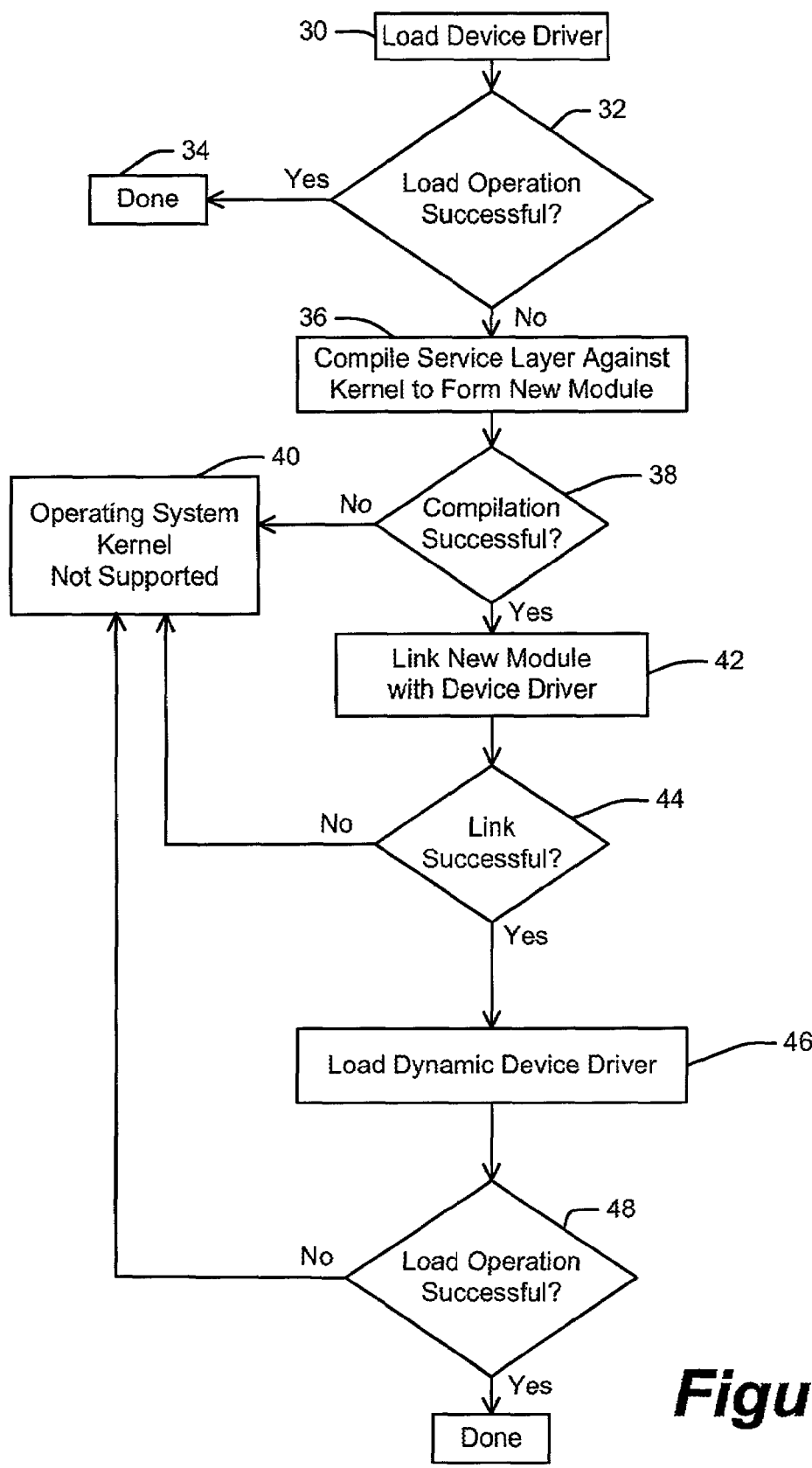
FIG. 2 is a flow diagram of the method for loading a device driver in a computer system having an open source operating system.

Shown in FIG. 2 is a series of method steps for establishing a device driver in a computer system that includes an open source operating system. At step 30, an attempt is made to load the existing device driver of the operating system. The computer manufacturer will typically include with the computer system a number of pre-compiled device drivers that are associated with standardized versions of the open source operating system. As an example, the computer manufacturer may choose to include as part of an open-source Linux operating system, pre-compiled device drivers that are associated with popular, standardized versions of the Linux operating system, including, for example, Linux 7.0 and Linux 7.1. As part of the loading operation of step 30, the computer system determines if a pre-compiled driver is associated with the kernel of the operating system. If a pre-compiled device driver exists that is associated with the kernel of the operating system, the device driver is loaded.

At step 32, it is determined whether the load operation was successful. The load operation is successful if a precompiled device driver exists that is associated with the kernel of the operating system. As such, the load operation is successful if the operating system is a standardized open source operating system and the computer manufacturer has provided to the user a pre-compiled device driver that is associated with the kernel of the standardized open source operating system. If it is determined that the load operation is successful at step 32, the process of establishing a device driver in the computer system concludes at step 34. If it is determined at step 32 that the load operation of step 30 is unsuccessful, the kernel of the open source operating system is not associated with or supported by any of the existing pre-compiled device drivers of the computer system. The open source kernel may not be recognized or associated with any of the pre-compiled device drivers of the computer system because the open source kernel may be a newly standardized kernel that is not yet supported by a pre-compiled device driver or because a user has made a user-specific modification to the device. In either event, a dynamic device driver, which can be associated with the unrecognized or modified kernel, must be built.

At step 36, the open source service layer, which is shown as element 14 in FIG. 1, is compiled against the kernel of the operating system. If the compilation is determined to be unsuccessful at step 38, processing ends and the user is notified at step 40 that the kernel of the operating system cannot be supported by the computer system. If the compilation is successful, a link operation is performed at step 42 in which the compiled service layer is linked to the compiled driver modules, which are shown in FIG. 1 as compiled driver modules 106-112, forming a dynamic device driver. If it is determined at step 44 that the link operation is unsuccessful, processing ends and the user is notified at step 40 that the kernel of the operating system cannot be supported by the computer system. Following a successful link operation, the linked compiled service layer and the compiled driver modules comprise the dynamic device driver. The dynamic device driver is next loaded at step 46. If the load of the dynamic device driver is determined at step 48 to be unsuccessful, processing ends and the user is notified at step 40 that the kernel of the operating system cannot be supported by the computer system. If the load of the dynamic device driver is successful, processing ends. The successful load of the dynamic device driver permits the kernel of the operating system to function with and make calls to the hardware of the computer system.

The invention described herein is applicable to any information handling system that includes an operating system and a hardware system, including any computer system, server, router, or any other instrumentality or aggregate of instrumentalities that is operable to compute, classify, process, transmit, receive, retrieve, originate, switch, store, display, manifest, detect, record, reproduce, handle, or utilize any form of information, intelligence, or data for business, scientific, control or other purposes.

Although the present disclosure has been described in detail, it should be understood that various changes, substitutions, and alterations can be made hereto without departing from the spirit and the scope of the invention as defined by the appended claims.

What is claimed is:

1. A method for establishing a device driver in an open source operating system, comprising the steps of:
   providing a device driver having multiple pre-compiled modules in executable form and a service layer in open source form, wherein each of the multiple pre-compiled modules is associated with a hardware architecture of the open source operating system;
   compiling the service layer against the kernel of the open source operating system after each modification to the kernel of the open source operating system, wherein the step of compiling the service layer against the kernel comprises the step of associating the naming convention of function calls in the kernel to the naming convention of expected function calls in the device driver;
   wherein the compiled service layer acts as an interface between the kernel of the operating system and the multiple pre-compiled executable modules of the device driver, such that the kernel cannot access proprietary information of the multiple pre-compiled executable modules and the compiled service layer is operable to send and receive function calls that are named according to the same naming convention;
   wherein the naming convention comprises the use of a suffix for the naming of function calls, the suffix providing a naming convention that is specific to the kernel of the operating system.

2. The method for establishing a device driver in an open source operating system of claim 1, further comprising the step of linking the compiled service layer to the multiple pre-compiled executable modules in executable form to form the device driver.

3. The method for establishing a device driver in an open source operating system of claim 2, further comprising the step of storing the device driver in memory.

4. A computer system comprising:
   a processor;
   a memory;
   an open source operating system having a kernel;
   a device driver, the device driver comprising,
      an executable module compiled from an open source service layer,
      multiple pre-compiled executable modules, wherein each of the multiple pre-compiled executable modules is associated with a hardware architecture of the computer system,
      wherein the executable module compiled from the open source service layer provides an interface between the kernel of the operating system and the multiple pre-compiled executable modules, such that the kernel cannot access proprietary information of the multiple pre-compiled executable modules, such that the executable module compiled from the open source service layer receives kernel-specific function calls from the kernel of the operating system, wherein the executable module is compiled from the open source service layer following each modification to the kernel of the operating system, and wherein the kernel of the operating system and the executable module compiled from the open source service layer send and receive function calls according to the same naming convention, and
      wherein the naming convention comprises the use of a suffix for the naming of function calls, the suffix providing a naming convention that is specific to the kernel of the operating system.

5. The computer system of claim 4, wherein the device driver is loaded in memory of the computer system.

6. A method for loading a device driver in a computer system having an open source operating system, comprising the steps of:
compiling an open source service layer against the kernel of the operating system following a modification to the kernel of the operating system;
linking the compiled service layer to a set of precompiled driver modules, each of the precompiled driver modules being associated with a hardware architecture of a computer system;
wherein the compiled service layer provides an interface between the kernel of the operating system and the precompiled driver modules, such that the kernel cannot access proprietary information of the pre-compiled executable module, and wherein the kernel of the operating system and the compiled service layer is operable to send and receive function calls that are named according to the same naming convention;
recompiling the service layer if it is determined that the kernel of the operating system has been modified, wherein the recompiled service layer is operable to send and receive function calls that are named according to the same naming convention; and
relinking the recompiled service layer to a set of precompiled driver modules.

7. The method for loading a device driver of claim 6, further comprising the step of recompiling the open source service layer if it is determined that the kernel of the open source service layer has been modified.

8. The method for loading a device driver of claim 6, further comprising the step of linking the recompiled service layer to the set of precompiled driver modules.

9. The method for loading a device driver of claim 6, further comprising the step of determining, prior to compilation of the open source service layer, whether a precompiled device driver exists that is associated with the kernel of the operating system and loading the precompiled device driver if such a device driver exists.

10. The method for loading a device driver of claim 6,
wherein the function calls passed between the kernel of the operating system and the compiled open source service layer are not specific to the hardware architecture of the computer system; and
wherein the function calls passed between the compiled open source service layer and the precompiled driver modules are specific to the hardware architecture of the computer system.

* * * * *

UNITED STATES PATENT AND TRADEMARK OFFICE
CERTIFICATE OF CORRECTION

PATENT NO. : 7,571,445 B2 Page 1 of 1
APPLICATION NO. : 09/998153
DATED : August 4, 2009
INVENTOR(S) : Lin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1027 days.

Signed and Sealed this

Seventh Day of September, 2010

David J. Kappos
*Director of the United States Patent and Trademark Office*